(12) United States Patent
Knapp et al.

(10) Patent No.: US 7,628,101 B1
(45) Date of Patent: Dec. 8, 2009

(54) PYROTECHNIC DROP MECHANISM FOR POWER TOOLS

(75) Inventors: William R. Knapp, Salinas, CA (US); Jean-Pierre Krauer, San Jose, CA (US); Wilfred H. Anderson, Los Gatos, CA (US); Kyle L. Petrich, New York, NY (US); Jeffrey Y. Hayashida, San Jose, CA (US); Helen J. Yoo, San Francisco, CA (US)

(73) Assignee: Power Tool Institute, Cleveland, OH (US)

( * ) Notice: Subject to any disclaimer, the term of this patent is extended or adjusted under 35 U.S.C. 154(b) by 435 days.

(21) Appl. No.: 11/589,344

(22) Filed: Oct. 30, 2006

Related U.S. Application Data (63) Continuation of application No. 11/374,319, filed on Mar. 13, 2006, now abandoned.

(51) Int. Cl.
*B27B 5/29* (2006.01)
(52) U.S. Cl. .................. 83/62.1; 83/58; 83/DIG. 1; 83/471.2; 83/477.2
(58) Field of Classification Search ................ 83/62.1, 83/58, 471.2, 581, 478, 490, DIG. 1, 663, 83/477.2, 781; 144/384, 391, 427, 154.5, 144/356; 307/326, 116, 328; 324/688, 661; 318/16, 480; 340/686.5, 686.6, 562
See application file for complete search history.

(56) References Cited

U.S. PATENT DOCUMENTS

| | | | |
|---|---|---|---|
| 6,227,563 B1 * | 5/2001 | Talisman | ............. 280/735 |
| 6,813,983 B2 | 11/2004 | Gass et al. | |
| 6,834,730 B2 | 12/2004 | Gass et al. | |
| 6,857,345 B2 | 2/2005 | Gass et al. | |
| 6,920,814 B2 | 7/2005 | Gass et al. | |
| 6,922,153 B2 | 7/2005 | Pierga et al. | |
| 6,945,149 B2 | 9/2005 | Gass et al. | |
| 6,994,004 B2 | 2/2006 | Gass et al. | |
| 6,997,090 B2 | 2/2006 | Gass et al. | |
| 7,024,975 B2 | 4/2006 | Gass et al. | |
| 7,077,039 B2 | 7/2006 | Gass et al. | |
| 7,098,800 B2 | 8/2006 | Gass | |
| 7,100,483 B2 | 9/2006 | Gass et al. | |

(Continued)

FOREIGN PATENT DOCUMENTS

DE 19609771 * 6/1998

*Primary Examiner*—Ghassem Alie
(74) *Attorney, Agent, or Firm*—K&L Gates LLP (57) ABSTRACT

A saw comprises a surface having an opening defined therein, a plate structure configured to be attached to the saw below the surface, and an arm pivotally attached to the plate structure about a first shaft. A blade is configured to be engaged with the arm at a location spaced from the first shaft. A portion of the blade extends through the opening when the saw is in a normal operating position. The saw comprises a firing mechanism comprising a barrel end portion having a bore defined therein and an extendable piston at least partially positioned within the bore. The barrel end portion is attached to the plate structure. The extendable piston engages the arm during its extension and causes the arm to pivot about the first shaft when the firing mechanism is activated by an activation signal. The pivoting of the arm causes the blade to be moved downwardly below the surface.

18 Claims, 7 Drawing Sheets

U.S. PATENT DOCUMENTS

| | | | |
|---|---|---|---|
| 7,121,358 B2 | 10/2006 | Gass et al. |
| 7,225,712 B2 | 3/2007 | Gass et al. |
| 7,197,969 B2 | 4/2007 | Gass et al. |
| 7,210,383 B2 | 5/2007 | Gass et al |
| 7,228,772 B2 | 6/2007 | Gass |
| 7,231,856 B2 | 6/2007 | Gass et al. |
| 7,284,467 B2 | 10/2007 | Gass et al. |
| 7,290,474 B2 | 11/2007 | Keller |
| 7,308,843 B2 | 12/2007 | Gass et al. |
| 7,350,444 B2 | 4/2008 | Gass et al. |
| 7,350,445 B2 | 4/2008 | Gass et al. |
| 7,357,056 B2 | 4/2008 | Gass et al. |
| 7,359,174 B2 | 4/2008 | Gass |
| 7,421,315 B2 | 9/2008 | Gass et al. |
| 7,481,140 B2 | 1/2009 | Gass et al. |
| 2002/0017181 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1* | 2/2002 | Gass et al. ................ 83/62.1 |
| 2002/0069734 A1 | 6/2002 | Gass et al. |
| 2002/0170399 A1 | 11/2002 | Gass et al. |
| 2003/0005588 A1 | 1/2003 | Gass et al. |
| 2003/0020336 A1 | 1/2003 | Gass et al. |
| 2003/0037651 A1 | 2/2003 | Gass et al. |
| 2003/0131703 A1 | 7/2003 | Gass et al. |
| 2003/0140749 A1 | 7/2003 | Gass et al. |
| 2004/0159198 A1 | 8/2004 | Peot et al. |
| 2004/0173430 A1 | 9/2004 | Gass |
| 2004/0226800 A1* | 11/2004 | Pierga et al. ............ 192/129 R |
| 2005/0041359 A1 | 2/2005 | Gass |
| 2005/0066784 A1 | 3/2005 | Gass |
| 2005/0139057 A1 | 6/2005 | Gass et al. |
| 2005/0139058 A1 | 6/2005 | Gass et al. |
| 2005/0155473 A1 | 7/2005 | Gass |
| 2005/0166736 A1 | 8/2005 | Gass et al. |
| 2005/0268767 A1 | 12/2005 | Pierga et al. |
| 2006/0101960 A1 | 5/2006 | Smith et al. |
| 2006/0123960 A1 | 6/2006 | Gass et al. |
| 2006/0123964 A1 | 6/2006 | Gass et al. |
| 2006/0179983 A1 | 8/2006 | Gass et al. |
| 2006/0225551 A1 | 10/2006 | Gass |
| 2006/0247795 A1 | 11/2006 | Gass et al. |
| 2006/0254401 A1 | 11/2006 | Gass et al. |
| 2007/0028733 A1 | 2/2007 | Gass |
| 2007/0186737 A1 | 8/2007 | Gass et al. |
| 2007/0199622 A1 | 8/2007 | Gass et al. |
| 2007/0240786 A1 | 10/2007 | Gass et al. |
| 2008/0016998 A1 | 1/2008 | Keller |
| 2008/0029184 A1 | 2/2008 | Gass |
| 2008/0041204 A1 | 2/2008 | Gass |
| 2008/0092702 A1 | 4/2008 | Gass et al. |

* cited by examiner

PYROTECHNIC DROP MECHANISM FOR POWER TOOLS

CROSS REFERENCE TO RELATED APPLICATIONS

This application is a continuation of U.S. patent application Ser. No. 11/374,319, filed Mar. 13, 2006 now abandoned, by William R. Knapp et al., entitled "Pyrotechnic Drop Mechanism for Power Tools.

BACKGROUND OF THE INVENTION

The present invention generally relates to power tools and to blade dropping systems for such power tools.

Systems have been developed and are described in a plurality of patent applications that are assigned to SD2, LLC which include various mechanisms that have a detection system for detecting contact between a human and a blade The detection system triggers a brake mechanism that typically includes a pawl structure that is urged into the blade by a biasing mechanism that is retained by a fusible member and is melted by a high energy electrical current. Severing the fusible member releases the pawl to stop the blade or to retract it below the work surface of a table saw, for example. The systems have disadvantages; for example they are expensive and inconvenient to use since they require the replacement of expensive modules after they have been fired, which is time-consuming and difficult. An additional disadvantage is the variability of the system based on the blade design.

SUMMARY OF THE INVENTION

Embodiments of a saw are disclosed of the type which has a top with an opening in the top through which a saw blade can extend, the height and angular orientation of which can be adjusted, and also configured to be retracted in response to an activation signal being applied, the saw comprising a plate structure configured to be mounted to the saw below the top, an arm pivotally mounted to the plate structure about a first shaft, a rotatable circular blade having an arbor mounted to the arm at a location spaced from the first shaft, and being configured so that at least a portion of the blade can extend through the top opening and be in position to cut a work piece when the blade is in its normal operating position, a drive motor with an output shaft operatively connected to power the saw blade, a firing mechanism having a barrel end portion with a cylindrical bore mounted to the plate structure and an extendable piston positioned in the bore, the piston engaging the arm during its extension and causing the arm to pivot about the first shaft when the firing mechanism is activated by the activation signal being applied, the pivoting of the arm causing the blade to be moved downwardly below the saw top toward its retracted position.

DETAILED DESCRIPTION

The preferred embodiments of the blade retracting mechanism that are shown and described herein are operable with a detection system that is designed and configured to be able to detect the presence of a person either by use of a mechanism that detects the proximity of a person's hand or possibly by virtue of detection of contact of a person's body with a portion of the saw or other tool that is designed to be a sensor. The most likely component to be used as a sensor is the saw blade, which would be used to detect the person's proximity or contact with a saw blade. If contact with a saw blade is necessary for detection, there would necessarily be at least some injury to a user depending upon the speed of approach and the speed in which the entire system operates.

Figures 1, 2:
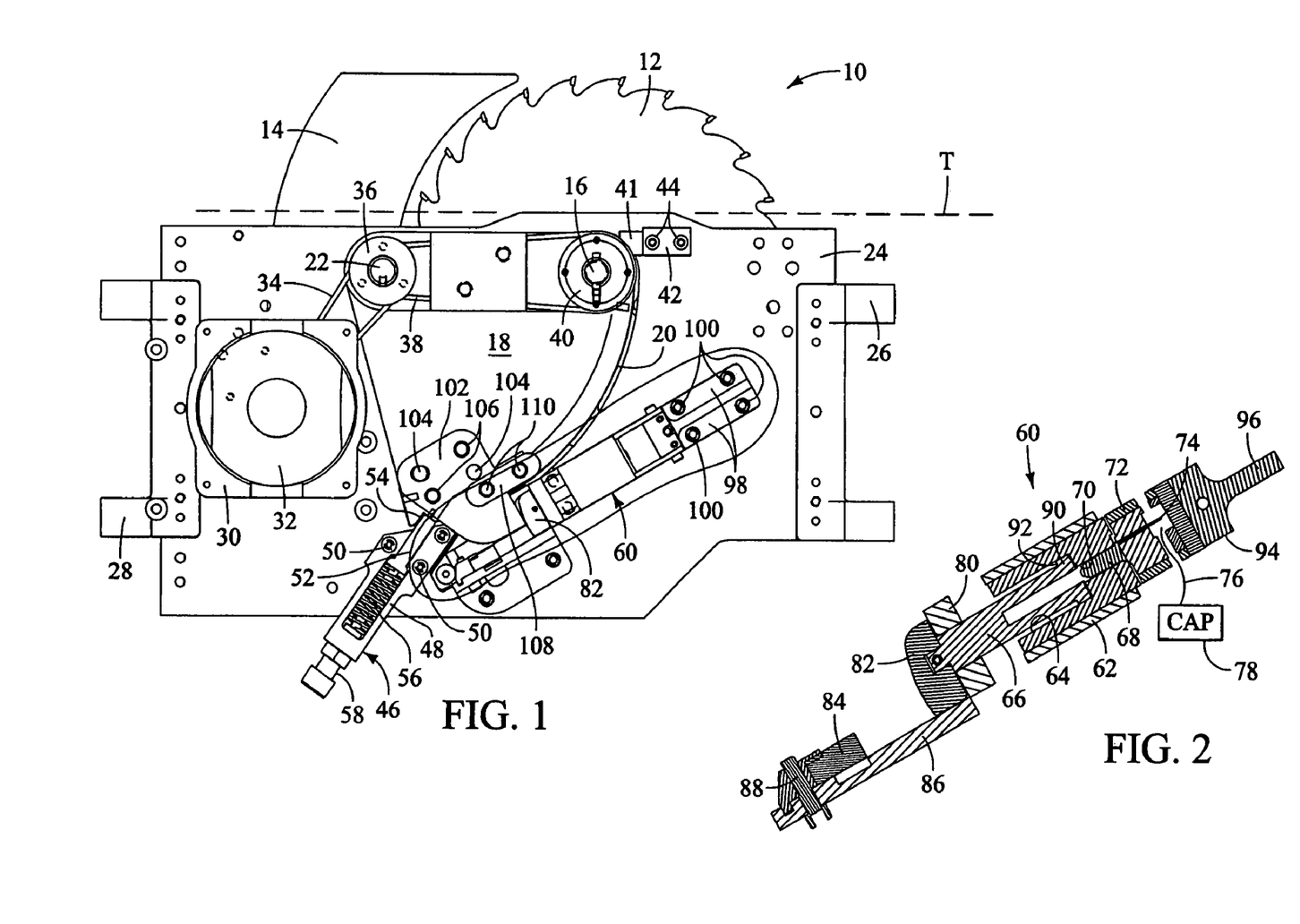
FIG. 1 is a side view of a preferred embodiment of the blade retracting mechanism, showing the blade in the normal operating position.
FIG. 2 is a cross section of a portion of the apparatus shown in FIG. 1, particularly illustrating the pyrotechnic firing mechanism.
Figures 3, 4:
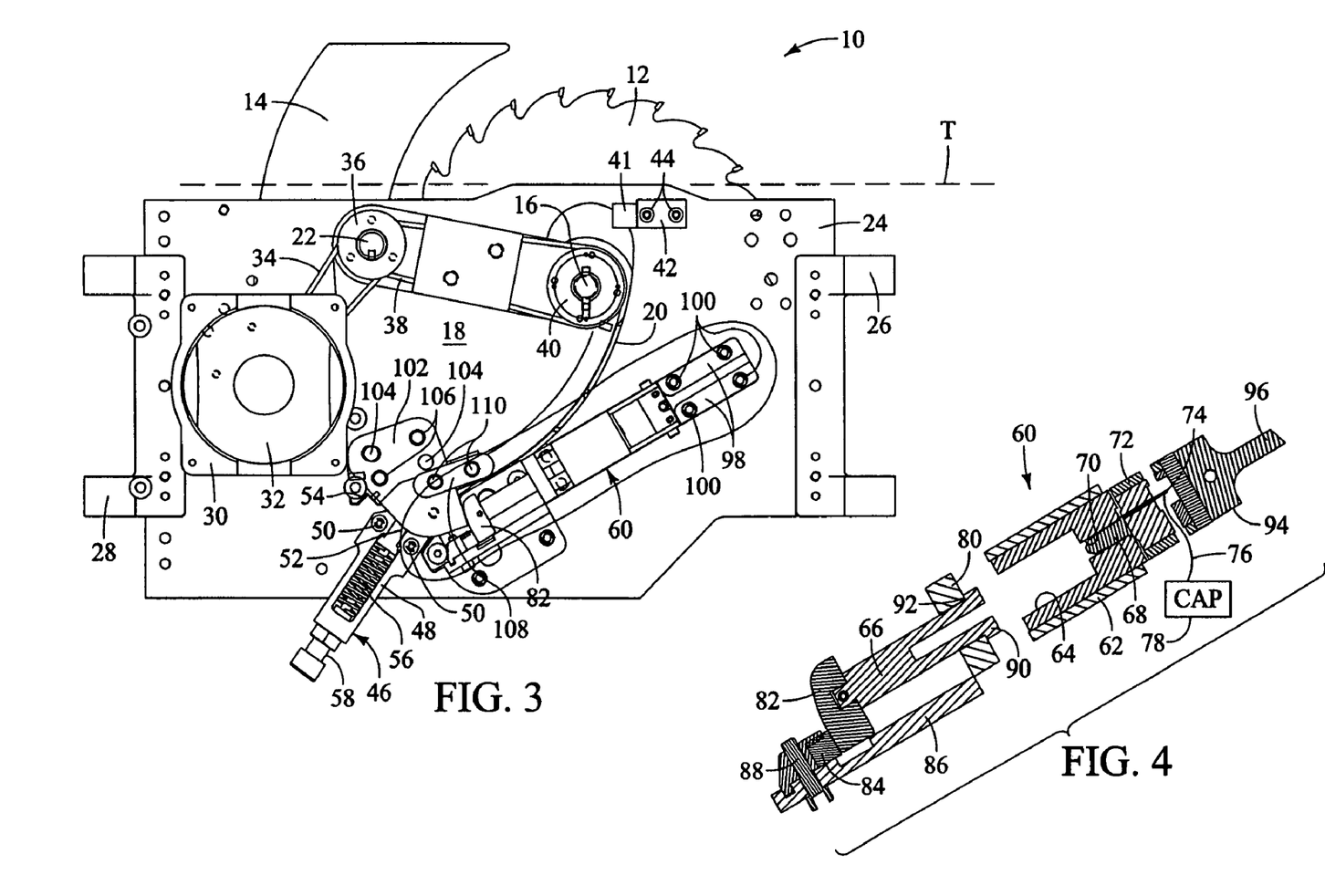
FIG. 3 is a side view of the apparatus shown in FIG. 1, but illustrating the saw blade in a partially retracted position.
FIG. 4 is a view similar to FIG. 2, but showing the firing mechanism immediately after firing when the piston is at the extent of its travel.

The preferred embodiment of the present invention is shown in FIGS. 1-6, with FIG. 1 showing a side view of a blade retracting mechanism indicated generally at 10, with the blade 12 being in a normal operating position, where the blade is near a riving knife 14. In FIG. 3, the blade 12 is shown to be partially retracted as would occur during operation of the mechanism 10 and in FIG. 5, the blade 12 is fully retracted below the surface of the table saw top which is approximately at the elevation shown by the dotted line T of FIGS. 1, 3 and 5. The blade 12 rotates on a shaft 16 that is journaled in a generally triangularly shaped arm 18 that has a curved lower surface 20. The arm 18 rotates around another shaft 22 that is attached to a large plate 24 that is mounted to the saw by mounting brackets 26 and 28 located on opposite ends of the plate 24. The plate 24 carries a motor base 30 that is mounted above the elevation of the plate 24 and carries a motor 32 for driving the saw blade 12.

The output shaft of the motor 32 is not shown, but it carries a pulley which drives a belt 34 and a pulley 36, with the pulley 36 being connected to another pulley or having an extension for driving a belt 38 and in turn drives a pulley 40 that is operatively connected by the shaft 16 to an arbor (not shown), but which drives the blade 12. Since the arm 18 is pivotable about the shaft 22, it should be understood that the motor 32 is configured to be able to drive the belts 34 and 38 via the motor pulley and pulley 36 regardless of the vertical position of the blade 12. Stated in other words, the distance between pulleys 36 and 40 remains constant as does the distance between pulley 36 and the motor drive shaft regardless of the vertical position of the blade 12.

When the blade is in the normal operating position as shown in FIG. 1, the top right surface of the arm 18 abuts against a stop member 41 that is mounted to the plate 24 by a mounting bracket 42 with bolts 44. The arm 18 is held in the upper position as shown in FIG. 1 by a detent assembly, indicated generally at 46, that comprises a main bracket 48 that is bolted to the plate 24 by bolts 50 and wherein a detent rod 52 engages a V-shaped recess 54. The rod 52 is biased into engagement with the recess 54 by a spring 56 that is seated on a bolt 58 and which is adjustable to vary the biasing force that is applied to the rod 52. The detent assembly 46 is therefore designed and configured to maintain the arm 18 in its normal operating position unless it is rotated downwardly with sufficient force to depress the detent rod 52 away from the V-shaped recess 54 and release the arm 18 for rotation.

Figures 5, 6:
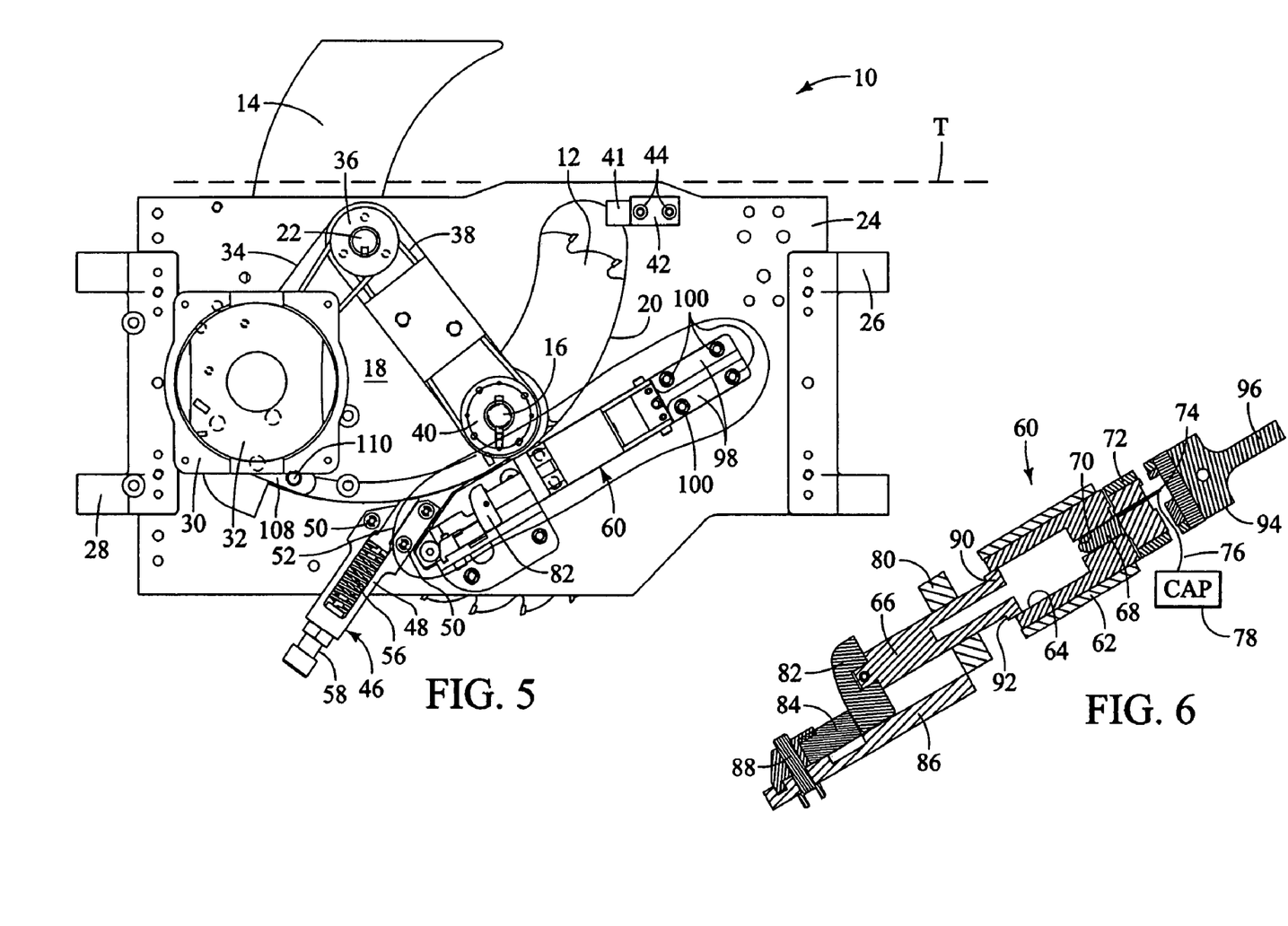
FIG. 5 is a side view of the apparatus shown in FIG. 1, but illustrating the saw blade in a fully retracted position.
FIG. 6 is a view similar to FIG. 2, but showing the firing mechanism after firing but with the piston reacting back to its post firing resetting position.
Figure 7:
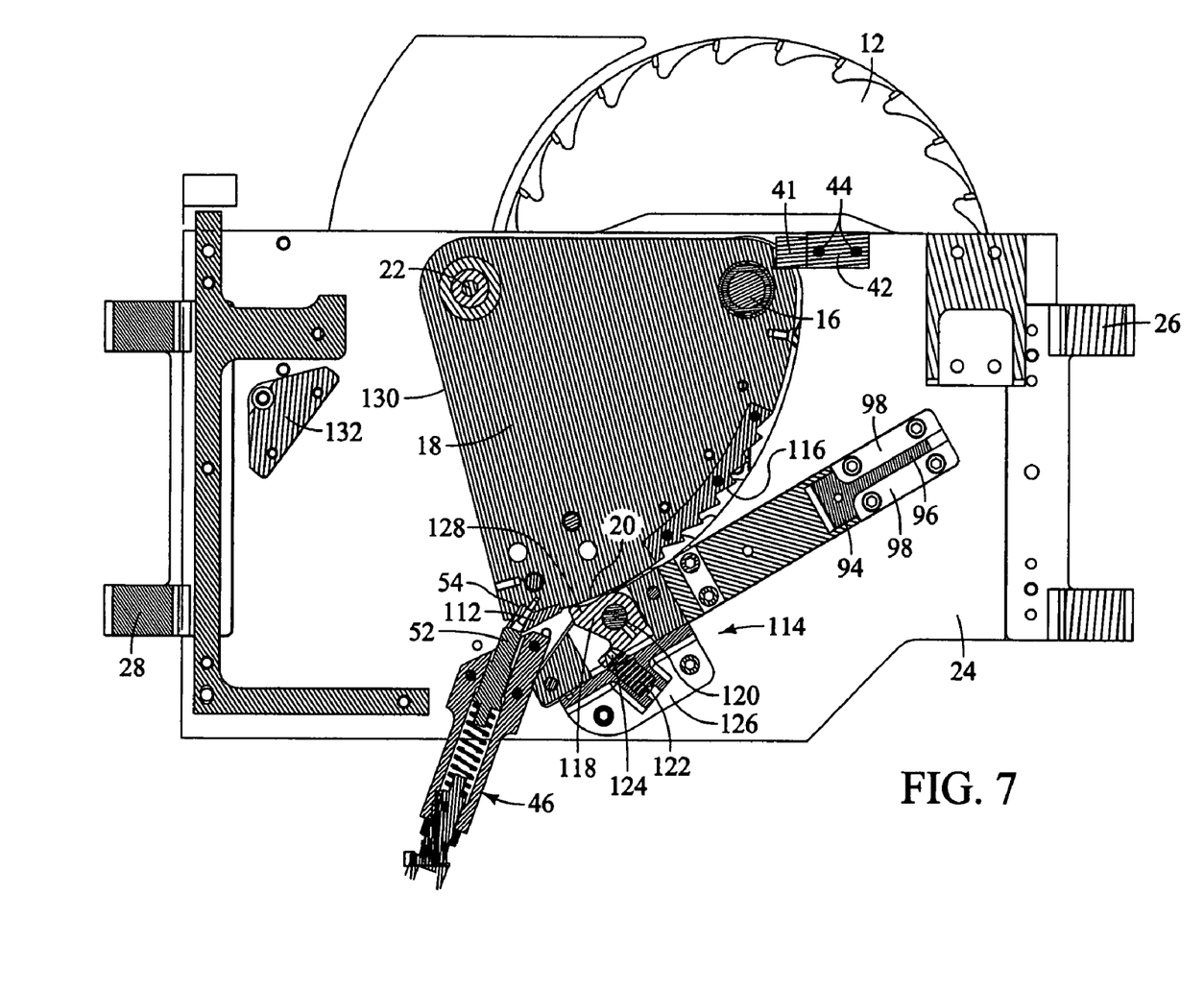
FIG. 7 is a side view of a portion of a second embodiment of the blade retracting mechanism and is shown with the blade in a normal operating position.

The force that is necessary to overcome the detent assembly 46 is provided by a firing mechanism that is indicated generally at 60. A cross-section of the mechanism is shown in FIGS. 2, 4 and 6, and comprises a cylindrical barrel structure 62 having a cylindrical bore 64 in which a piston 66 is positioned. The mechanism 60 has a replaceable cartridge 68 that is placed in a smaller bore 70 with the cartridge 68 being retained by an end cap structure 72 through which a metal pin 74 is located with the pin extending to the cartridge 68 so that it can be fired. The pin 74 is connected to a wire 76 which in turn is connected to a capacitor 78.

During operation, the capacitor 78 is switched to release its electrical charge which travels through wire 76 to heat the pin 74 to a temperature that fires the cartridge 68 and this causes high pressure gases to be produced and cause the piston 66 to be moved to the left out of the bore 64. The piston 66 is guided by a support 80 having a cylindrical opening therein sized to receive the cylindrical piston 66. As it is driven in the leftward direction, i.e., away from the barrel 62, a hammer 82 is driven toward a hammer damper 84 that is mounted to a skid 86 that also has a mounting structure, indicated generally at 88, which holds the damper 84 and cushions the hammer 82. During its travel the hammer 82 drives the arm 18 in the clockwise direction around the shaft 22. The piston 66 has an enlarged end portion 90 that defines a shoulder 92 that engages the support member 80 at the end of its travel. It should also be understood that the skid 86 and support member 80 are effectively connected together. An end bracket 94 has a narrow center portion 96 that extends rearwardly and it is retained by a pair of support members 98 (FIG. 1) located on opposite sides of the center portion 96. The support members 98 are bolted to the plate 24 by bolts 100.

An anvil 102 is connected to the arm 18 by a pair of pins 104 and a pair of bolts 106 as well as by a strap 108 that is bolted on opposite ends to the anvil 102 and the arm 18. It should be apparent that the front surface of the hammer 82 is in contact with the adjoining surface of the anvil 102 so that when the firing mechanism 60 is activated, the piston 66 will cause the hammer 82 to move the anvil 102 and arm 18 in a clockwise direction so as to retract the blade 12 below the surface T before the user is seriously injured.

When the microprocessor triggers the pyrotechnic device, a high amperage current is sent through the wire 76 to the electrode or pin 74, which directs the current to the back of the cartridge 68. The cartridge 68 fires causing a rapid pressure rise in the barrel 62 behind the piston 66 that produces approximately 10,000 pounds of force that propels it toward the anvil 102. The piston 66 is forced to move along the barrel axis pushing the anvil 102 as it does so. This pushing force overrides the detent assembly 46 and the arm 18 rotates in a clockwise direction. When the arm 18 moves to its position of maximum travel as shown in FIG. 5, the hammer 82 fully compresses the hammer damper 84. In this position, the barrel 62 vents the combustion gases because the piston 66 moves past the end of the barrel 62 thus relieving the barrel pressure in preparation to stopping the piston 66. Since the arm 18 and hammer 82 are not physically connecting, i.e., they only touch, the arm 18 is free to continue rotating even though the piston 66 stops. The arm 18 continues to rotate until it contacts a mechanical stop that is not shown, at which time its movement ends. The hammer damper 84 then relaxes and pushes the hammer 82 and piston 66 back into the barrel 62. The cartridge 68 is a commonly available 22 caliber nail gun cartridge that is used in construction and costs about $0.05. An advantage of the preferred embodiments of the present invention is that once the cartridge 68 is fired, the end cap 72 can be removed enabling the spent cartridge shell to be removed. The firing mechanism 60 can be rearmed by placing another cartridge 68 in the bore 70, inserting another pin 74 in the end cap 72, connecting the wire 76 to the pin and recharging the capacitor 78.

In a second preferred embodiment shown in FIGS. 7-10, reference numbers that have been given to the first preferred embodiment shown in FIGS. 1-6 are used where the components are similar. In the embodiment shown in FIG. 7, the arm 18 has structure that interacts with a detent assembly 46 in a slightly different manner, i.e., the V-shape recess 54 is not directly contacted by the detent rod 52, but contains an extension piece 112 that extends beyond the curved surface 20 of the arm 18 and contacts the end of the detent rod 52 as shown.

This extension is necessary because of a slight modification to the placement of the detent assembly 46 to accommodate the addition of an anti-bounce mechanism, indicated generally at 114 that is located below the anvil 102. The outer surface 20 of the arm 18 has a number of serrated teeth 116 along a portion of the surface which are positioned to engage a ratchet assembly 118 that pivots about a shaft 120 that is operatively connected to the plate 24. A compression spring 122 has one end engaging an extension 124 of the ratchet assembly and the opposite end bearing against a bracket 126 so that a pawl 128 of the ratchet assembly 118 is biased toward the arm 18.

Figure 8:
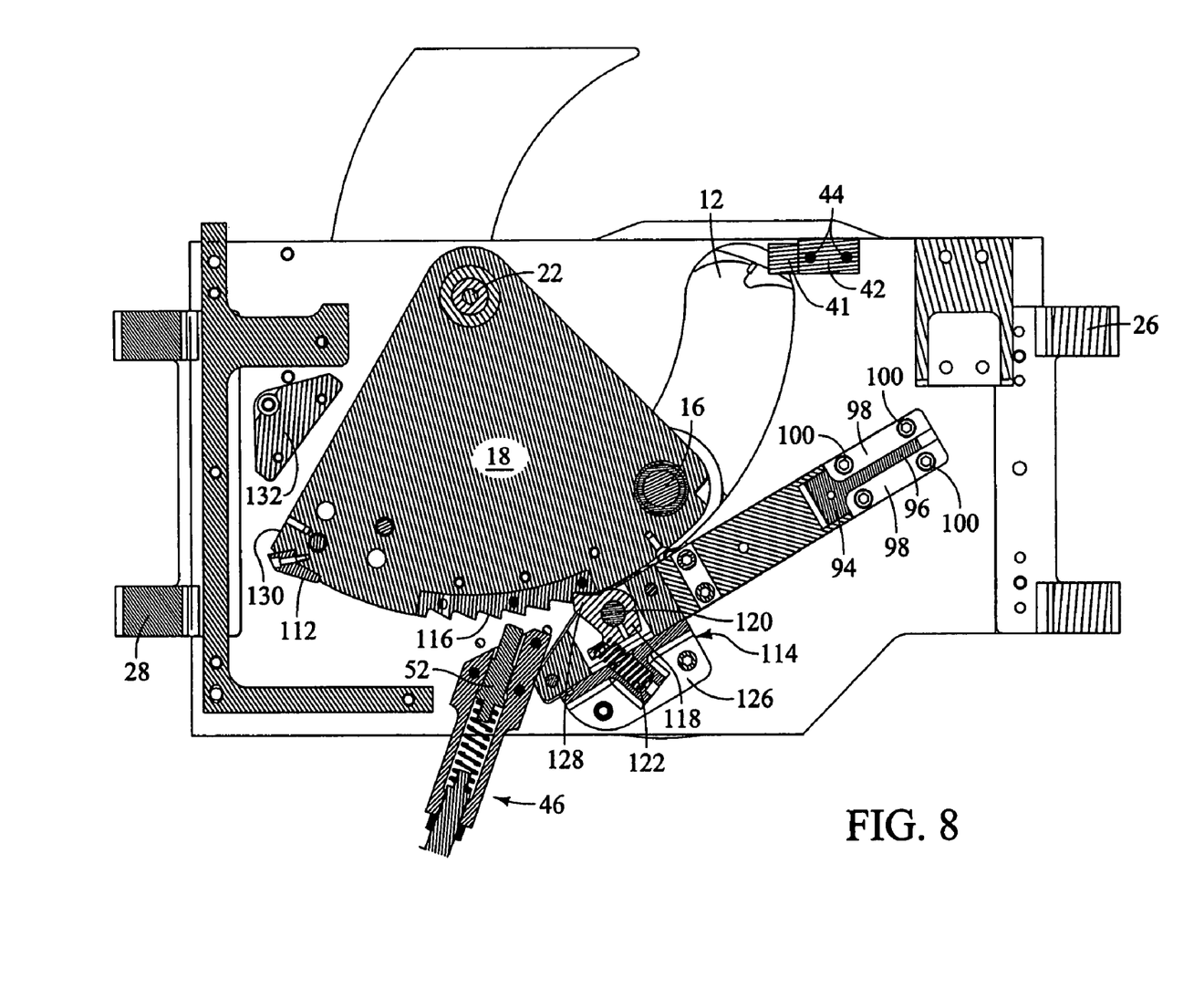
FIG. 8 is a view of the apparatus shown in FIG. 7, but illustrating the blade in a fully retracted position.
Figure 9:
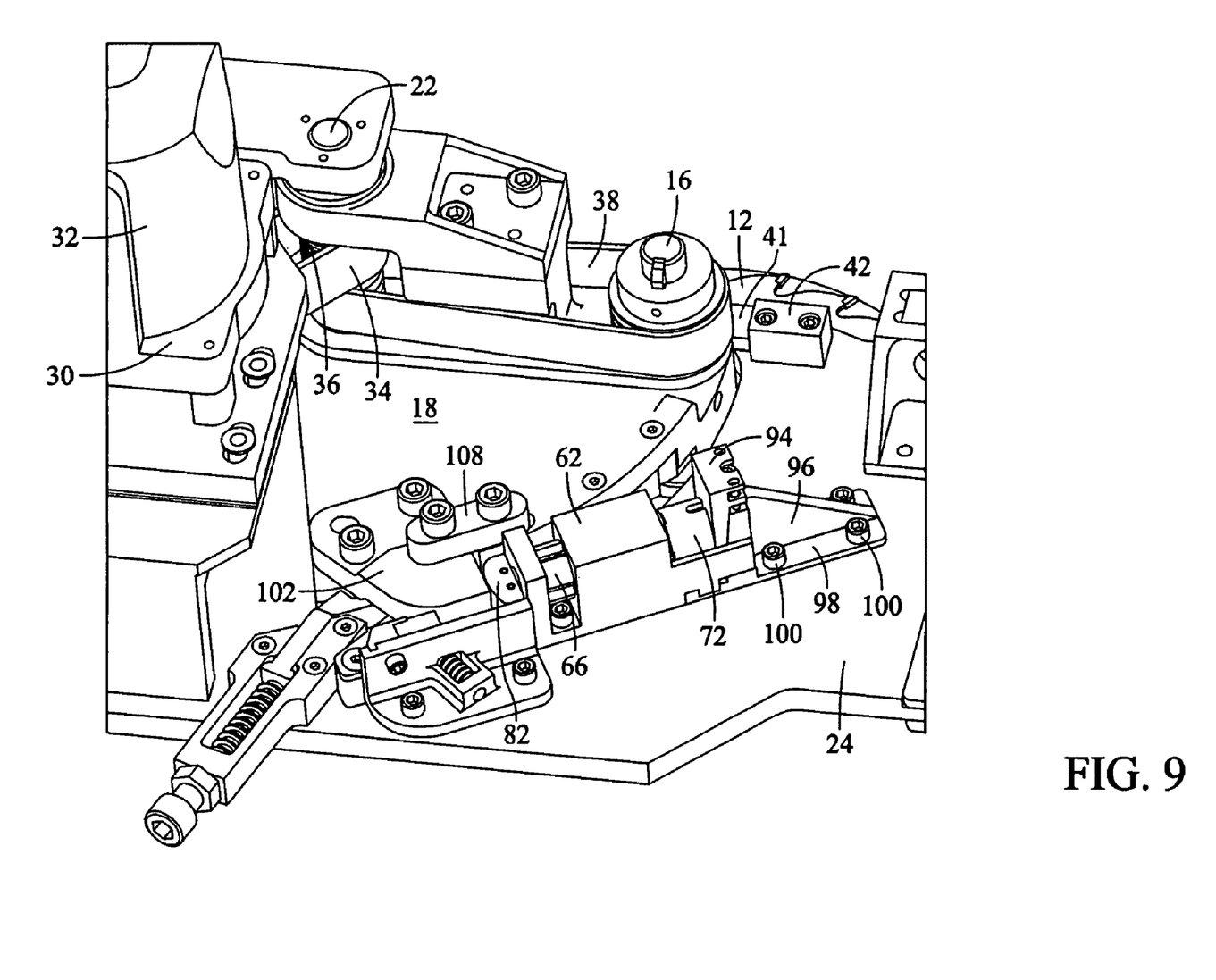
FIG. 9 is an idealized perspective view of a portion of the apparatus shown in FIG. 8, with the blade in its normal operating position.
Figure 10:
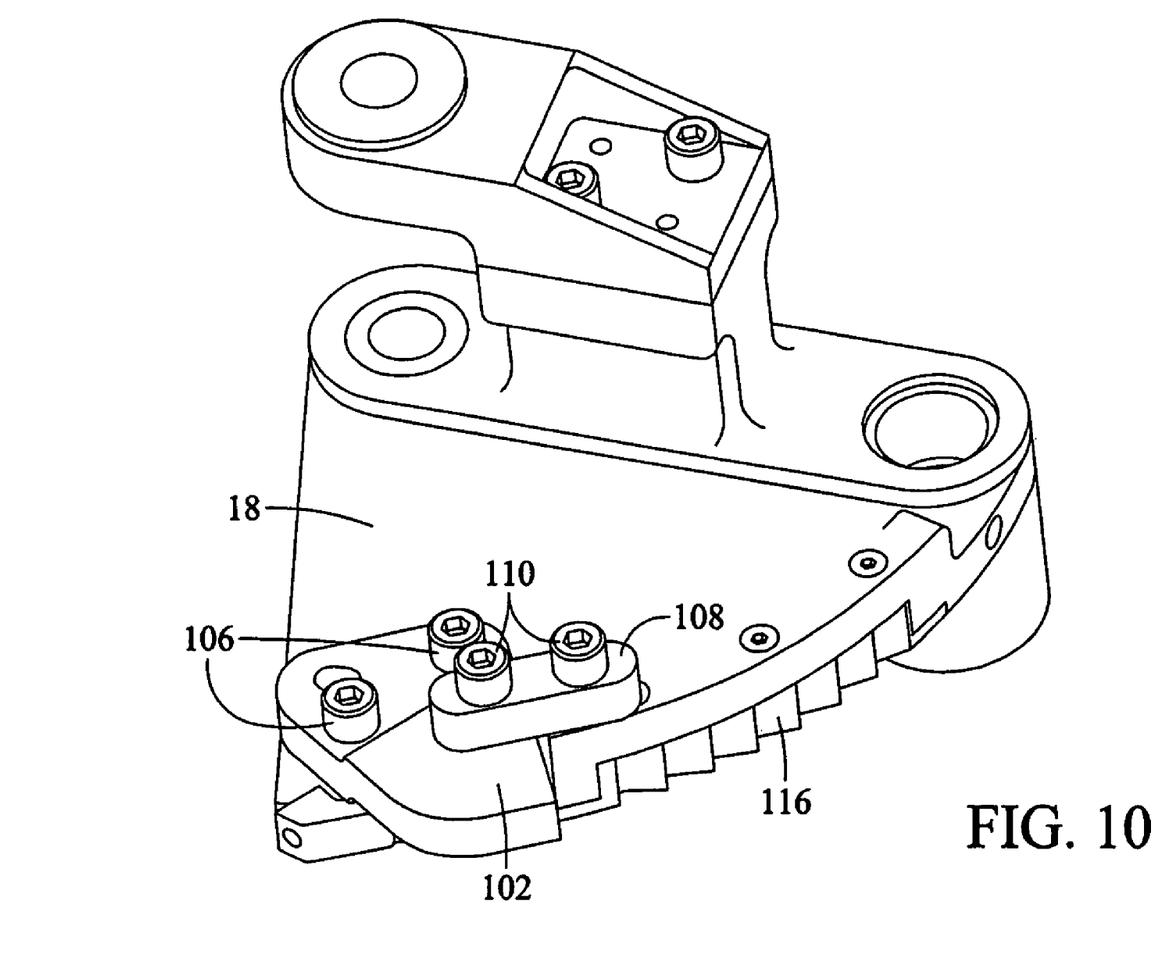
FIG. 10 is a similar perspective view of a portion of the apparatus shown in FIG. 9 illustrating portions of the mechanism that were hidden from view in FIG. 9.

After the firing mechanism 60 rotates the arm 18 in a clockwise direction, its left surface 130 will contact a stop or damper 132. Because of the tremendous force having been applied to the arm 18, it is moving rapidly and bounces off the stop 132. As shown in FIG. 8, as the arm 18 bounces off of the stop 132, the pawl 128 will engage one of the teeth 116 and stop the counterclockwise movement of the arm 18 and prevent the blade 12 from moving upwardly above the tabletop to potentially strike the user. While not shown, a pull lever is preferably provided to release the pawl 128 from the teeth 116 as the arm 18 is returned to its normal operation position. While adjustable, it is preferred that the amount of force needed to release the pawl 128 be in the range of about 10 to about 20 pounds. The amount of force needed to lift the arm 18 to its normal operation position is within the range of about 10 to about 20 pounds and the amount of force to overcome the spring 56 in the detent assembly 46 to latch the arm 18 in the normal operating position is preferably within the range of about 15 to about 25 pounds.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A saw of the type which has a top with an opening in the top through which a saw blade can extend, the height and angular orientation of which can be adjusted, and also configured to be retracted in response to an activation signal being applied, the saw comprising:

a plate structure configured to be mounted to the saw below the top;

an arm pivotally mounted to the plate structure about a first shaft;

a rotatable circular blade having an arbor mounted to the arm at a location spaced from the first shaft, and being configured so that at least a portion of the blade can extend through the top opening and be in a position to cut a work piece when the blade is in its normal operating position;

a drive motor with an output shaft operatively connected to power the blade;

a firing mechanism having a barrel end portion with a cylindrical bore mounted to the plate structure and an extendable piston positioned in the bore, the extendable piston engaging the arm during its extension and causing the arm to pivot about the first shaft when the firing mechanism is activated by the activation signal being applied, the pivoting of the arm causing the blade to be moved downwardly below the top toward its retracted position;

wherein a lower portion of the arm has a curved outer surface at a curvature that is defined by a constant radius about the first shaft that extends from the arbor through an arc of about 90 degrees, the outer surface having a plurality of teeth configured to engage a ratchet member; and a ratchet assembly having a ratchet member biased toward the teeth and being configured to engage the teeth to counter kick back of the arm.

2. A saw as defined in claim 1 wherein the first shaft and the arbor are generally horizontally aligned with one another when the blade is in its normal operating position, the arm having a lower extension with an anvil portion spaced from the first shaft and the arbor for being engaged by an outer portion of the extendable piston.

3. A saw as defined in claim 2 wherein the extendable piston has a hammer located at its outer end portion for contacting the anvil portion, the hammer moving the arm through an arc sufficient to lower the blade below the top.

4. A saw as defined in claim 3 wherein said barrel end portion has a removable end cap structure that reveals a small bore that communicates to said cylindrical bore, said small bore being sized to receive a pyrotechnic cartridge, said end cap structure being configured to accept a metal pin that can be connected to a power source for heating said pin and firing said cartridge.

5. A saw as defined in claim 4 wherein said cartridge is a small caliber commercial nail gun cartridge that when fired creates temperature that fires the cartridge which produces combustion gases that cause a rapid pressure rise in the barrel bore behind the piston that produces several thousand pounds of force to propel the piston from said barrel portion.

6. A saw as defined in claim 5 wherein said piston reaches a substantial portion of its extension, it causes said combustion gases to be vented, thus relieving the barrel pressure in preparation to stopping said piston.

7. A saw as defined in claim 3 further comprising a damper member connected to one of said arm or said firing mechanism and positioned to be engaged by said hammer and stop its movement.

8. A saw as defined in claim 1 further comprising a detent assembly mounted to said plate structure and engaging said arm to releasably hold said arm in its position when said blade is in its normal operating position.

9. A saw as defined in claim 8 wherein said detent assembly comprises a movable member that is configured to releasably engage a recess in said arm, said movable member being biased toward engagement, said hammer contacting said anvil during activation of said firing mechanism overcoming said bias and moving said arm.

10. A saw as defined in claim 1 wherein said drive motor is mounted to said plate structure, said output shaft of said motor having a first pulley, said first shaft having interconnected second and third pulleys and said arbor having a fourth pulley, said saw having a first belt interconnecting said first and second pulleys and a second belt interconnecting said third and fourth pulleys, so that said motor drives said blade during operation.

11. A saw as defined in claim 3 further comprising a stop damper mounted to said plate structure configured to engage said arm after it has rotated through an arc sufficient to move said blade to its retracted position.

12. A saw as defined in claim 1 wherein the plate structure comprises a generally flat steel plate having a thickness within the range of about $3/8$ inches to about $1/2$ inches.

13. A saw comprising a working surface having an opening defined therein, the saw comprising:

a plate structure configured to be attached to the saw at least partially below the working surface;

an arm pivotally attached to the plate structure about a first shaft, the arm comprising a surface having at least two teeth;

a blade engaged with the arm at a location spaced from the first shaft, the blade positioned within the opening such that at least a portion of the blade extends through the opening and is situated to cut a work piece when the saw is in a normal operating position; and a firing mechanism comprising
a barrel end portion having a bore defined therein, wherein the barrel end portion is attached to the plate structure, and an extendable piston at least partially positioned within the bore, the extendable piston engaging the arm during its extension and causing the arm to pivot about the first shaft when the firing mechanism is activated by an activation signal, the pivoting of the arm causing the blade to be moved downwardly below the working surface; and a ratchet assembly comprising a ratchet member biased toward the at least two teeth and configured to engage at least one of the teeth to counter kick back of the arm.

14. The saw as defined in claim 13 wherein the surface of the arm comprises a curved outer surface at a curvature that is defined by a constant radius about the first shaft that extends from the arbor through an arc of about 90 degrees.

15. A saw comprising a working surface having an opening defined therein, the saw comprising:

a plate structure configured to be attached to the saw below the working surface;

an arm movably attached to the plate structure about a first shaft, the arm comprising at least two teeth;

wherein a blade is configured to be engaged with the arm at a location spaced from the first shaft, the blade configured to be positioned within the opening such that at least a portion of the blade extends through the opening and is situated to cut a work piece when the saw is in a normal operating position;

a firing mechanism comprising
a barrel end portion having a bore defined therein, wherein the barrel end portion is attached to the plate structure, and a firable piston configured to be at least partially positioned within the bore, the firable piston movable between a first unfired position, where the blade is in the normal operating position, and a second fired position, where the blade is moved into a position below the working surface of the saw, the firable piston in communication with an activation signal and a ratchet assembly comprising a ratchet member biased toward the at least two teeth and configured to engage at least one of the teeth to counter kick back of the arm.

16. The saw as defined in claim 15 wherein the arm comprises a curved outer surface at a curvature that is defined by a constant radius about the first shaft that extends from the arbor through an arc of about 90 degrees.

17. A saw of the type that has a top with an opening in the top through which a saw blade can extend, the height and angular orientation of which can be adjusted, and also configured to be retracted in response to an activation signal being applied, the saw comprising:

a plate structure configured to be mounted to the saw below the top;

an arm pivotally mounted to the plate structure about a first shaft;

a rotatable circular blade having an arbor mounted to the arm at a location spaced from the first shaft, and configured so that at least a portion of the blade can extend through the top opening and be in a position to cut a work piece when the blade is in its normal operating position;

a drive motor with an output shaft operatively connected to power the blade;

a firing mechanism having a barrel end portion with a cylindrical bore mounted to the plate structure and an extendable piston positioned in the bore, the extendable piston engaging the arm during its extension and causing the arm to pivot about the first shaft when the firing mechanism is activated by the activation signal being applied, the pivoting of the arm causing the blade to be moved downwardly below the top toward its retracted position;

wherein the first shaft and the arbor are generally horizontally aligned with one another when the blade is in its normal operating position, the arm having a lower extension with an anvil portion spaced from the first shaft and the arbor for being engaged by an outer portion of the extendable piston, wherein the extendable piston has a hammer located at its outer end portion for contacting the anvil portion, the hammer moving the arm through an arc sufficient to lower the blade below the top, and wherein the lower portion of the arm has a curved outer surface at a curvature that is defined by a constant radius about the first shaft that extends from the arbor through an arc of about 90 degrees, the outer surface having a plurality of teeth configured to engage a ratchet member; and a ratchet assembly having a ratchet member biased toward the teeth and configured to engage the teeth to counter kick back of the arm.

18. A saw of the type that has a top with an opening in the top through which a saw blade can extend, the height and angular orientation of which can be adjusted, and also configured to be retracted in response to an activation signal being applied, the saw comprising:

a plate structure configured to be mounted to the saw at least partially below the top;

an arm pivotally mounted to the plate structure about a first shaft;

wherein a blade having an arbor is configured to be mounted to the arm at a location spaced from the first shaft, and is configured so that at least a portion of the blade can extend through the top opening and be in a position to cut a work piece when the blade is in its normal operating position;

a firing mechanism having a barrel end portion defining a bore mounted to the plate structure and an extendable piston positioned within the bore, the extendable piston engaging the arm during its extension and causing the arm to pivot about the first shaft when the firing mechanism is activated by the activation signal being applied, the pivoting of the arm causing the blade to be moved downwardly below the top toward its retracted position;

wherein the first shaft and the arbor are generally horizontally aligned with one another when the blade is in its normal operating position, the arm having a lower extension with an anvil portion spaced from the first shaft and the arbor configured to be engaged by an outer portion of the extendable piston, wherein the extendable piston has a hammer located at its outer end portion for contacting the anvil portion, the hammer moving the arm through an arc sufficient to lower the blade below the top, and wherein the lower portion of the arm has a curved outer surface at a curvature that is defined by a constant radius about the first shaft that extends from the arbor through an arc of about 90 degrees, the outer surface having a plurality of teeth configured to engage a ratchet member; and a ratchet assembly having a ratchet member biased toward the teeth and configured to engage the teeth to counter kick back of the arm.

* * * * *